(12) United States Patent
Jiang et al.

(10) Patent No.: US 11,964,350 B2
(45) Date of Patent: Apr. 23, 2024

(54) PULLER, CLAW, AND USAGE METHOD OF PULLER

(71) Applicant: YANTAI JEREH PETROLEUM EQUIPMENT & TECHNOLOGIES CO., LTD., Shandong (CN)

(72) Inventors: Chen Jiang, Shandong (CN); Xiaobin Li, Shandong (CN); Jixin Wang, Shandong (CN); Baojie Wang, Shandong (CN); Baoguo Jian, Shandong (CN); Peng Li, Shandong (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 180 days.

(21) Appl. No.: 17/687,421

(22) Filed: Mar. 4, 2022

(65) Prior Publication Data
US 2023/0001524 A1     Jan. 5, 2023

(30) Foreign Application Priority Data

Jun. 30, 2021 (CN) .......................... 202110736085.X

(51) Int. Cl.
| | |
|---|---|
| *B23P 19/00* | (2006.01) |
| *B23P 19/02* | (2006.01) |
| *B23P 19/027* | (2006.01) |
| *B25B 27/06* | (2006.01) |
| *F16K 51/00* | (2006.01) |

(52) U.S. Cl.
CPC .......... *B23P 19/025* (2013.01); *B23P 19/027* (2013.01); *B25B 27/062* (2013.01); *F16K 51/00* (2013.01)

(58) Field of Classification Search
CPC ........ B23P 19/00; B23P 19/025; B25B 27/00; B25B 27/24
See application file for complete search history.

(56) References Cited

U.S. PATENT DOCUMENTS

| | | | |
|---|---|---|---|
| 4,207,664 A | 6/1980 | Zoula | |
| 4,884,480 A * | 12/1989 | Briese | ..................... B25B 13/44 81/157 |
| 5,226,208 A * | 7/1993 | Gracey | .................. F16C 35/062 29/265 |
| 2018/0281128 A1* | 10/2018 | Rasmussen | ........... B23P 19/025 |
| 2022/0339765 A1* | 10/2022 | Vela | ........................ B25B 27/24 |
| 2023/0001524 A1* | 1/2023 | Jiang | ..................... B23P 19/025 |

FOREIGN PATENT DOCUMENTS

| | | | | |
|---|---|---|---|---|
| CN | 2855651 Y | 1/2007 | | |
| CN | 203566615 U | 4/2014 | | |
| CN | 113263476 A | * 8/2021 | ............ B23P 19/025 |

* cited by examiner

*Primary Examiner* — Lee D Wilson
(74) *Attorney, Agent, or Firm* — XSENSUS LLP

(57) ABSTRACT

A puller includes a first claw and a second claw arranged opposite to each other. The first claw includes a first pulling part, a first limiting part and a first connecting part. The first limiting part includes a first body part, a first notch part and a second notch part. The second claw includes a second pulling part, a second limiting part and a second connecting part. The second limiting part includes a second body part, a third notch part and a fourth notch part. A size of the second pulling part is smaller than or equal to a size of the second notch part.

15 Claims, 8 Drawing Sheets

PULLER, CLAW, AND USAGE METHOD OF PULLER

For all purposes, the present application claims priority of the Chinese Patent Application No. 202110736085.X, filed on Jun. 30, 2021 and entitled "Puller, Claw, and Usage Method of Puller", the disclosure of which is incorporated herein by reference in its entirety as part of the present application.

TECHNICAL FIELD

At least one embodiment of the present disclosure relates to a puller, a claw and a usage method of the puller.

BACKGROUND

In oilfield operations and shale gas operations, especially cementing, fracturing, acidizing and other operations, with the increasingly severe fracturing conditions and the increasingly higher pressure, the pressure and the impact load borne by a valve carrier (also known as "valve seat") in a hydraulic end of a plunger pump are continuously increased. Because there is an interference fit between the valve seat and a valve box, the valve seat is tightly pressed in the valve box, which brings great difficulties to the disassembly and replacement of the valve seat and reduces the operation efficiency.

SUMMARY

Embodiments of the present disclosure provide a puller, a claw, and a usage method of the puller. The puller of embodiments of the present disclosure is convenient to be disassembled and is not easy to be damaged.

Embodiments of the present disclosure provides a puller comprising a first claw and a second claw arranged opposite to each other. The first claw comprises a first pulling part, a first limiting part and a first connecting part connecting the first pulling part and the first limiting part. The first limiting part comprises a first body part, a first notch part and a second notch part. The first notch part is located at one side of the first body part close to the second claw in a first direction, and the second notch part is located at one side of the first notch part away from the first body part in the first direction. A size of the second notch part in a second direction is larger than that of the first notch part in the second direction, and the second direction intersects with the first direction. The second claw comprises a second pulling part, a second limiting part and a second connecting part connecting the second pulling part and the second limiting part. The second limiting part comprises a second body part, a third notch part and a fourth notch part. The third notch part is located at one side of the second body part close to the first claw in the first direction, and the fourth notch part is located at one side of the third notch part away from the second body part in the first direction. A size of the fourth notch part in the second direction is larger than that of the third notch part in the second direction. A size of the first limiting part in the first direction and a size of the first pulling part in the first direction are both larger than that of the first connecting part in the first direction. A size of the second limiting part in the first direction and a size of the second pulling part in the first direction are both larger than that of the second connecting part in the first direction. A size of the second pulling part in the second direction is smaller than or equal to that of the second notch part in the second direction.

According to embodiments of the present disclosure, the first claw and the second claw have the same shape and the same size, and a size of the first pulling part in the second direction is smaller than or equal to that of the fourth notch part in the second direction.

According to embodiments of the present disclosure, the first limiting part comprises a first surface connected with the first connecting part and a second surface arranged opposite to the first surface. An orthogonal projection of the first body part on a first reference plane where the second surface is located, an orthogonal projection of the first notch part on the first reference plane, and an orthogonal projection of the second notch part on the first reference plane are combined to form a first semicircle. The orthogonal projection of the first body part on the first reference plane overlaps with an arc side of the first semicircle. The orthogonal projection of the second notch part on the first reference plane overlaps with a straight line of the first semicircle.

According to embodiments of the present disclosure, the second limiting part comprises a third surface connected with the second connecting part and a fourth surface arranged opposite to the third surface. An orthographic projection of the second body part on a second reference plane where the third surface is located, an orthographic projection of the third notch part on the second reference plane, and an orthographic projection of the fourth notch part on the second reference plane are combined to form a second semicircle. The orthogonal projection of the second body part on the second reference plane overlaps with an arc side of the second semicircle. The orthogonal projection of the fourth notch part on the second reference plane overlaps with a straight line of the second semicircle.

According to embodiments of the present disclosure, the first semicircle and the second semicircle are configured to be combined into a complete circle.

According to embodiments of the present disclosure, the orthogonal projection of the second notch part on the first reference plane is a first rectangle, and the orthogonal projection of the first notch part on the first reference plane is a shape formed by a first circular arc and a long side of the first rectangle.

According to embodiments of the present disclosure, the orthogonal projection of the fourth notch part on the second reference plane is a second rectangle, and the orthogonal projection of the third notch part on the second reference plane is a shape formed by a second circular arc and a long side of the second rectangle.

According to embodiments of the present disclosure, a size of the first pulling part in a third direction is larger than ½ of a size of the first connecting part in the third direction.

According to embodiments of the present disclosure, a size of the second pulling part in a third direction is larger than ½ of a size of the second connecting part in the third direction.

According to embodiments of the present disclosure, the first connecting part comprises a first inner sidewall and a first outer sidewall. The first inner sidewall is connected with a surface of the first body part close to the first notch part, and the first outer sidewall is arranged opposite to the first inner sidewall.

According to embodiments of the present disclosure, the second connecting part comprises a second inner sidewall and a second outer sidewall. The second outer sidewall is connected with a surface of the second body part close to the third notch part, and the second outer sidewall is arranged opposite to the second inner sidewall.

According to embodiments of the present disclosure, the first pulling part comprises a third inner sidewall and a third outer sidewall. The third inner sidewall is connected with the first inner sidewall, the third inner sidewall is arranged opposite to the third outer sidewall, and the third inner sidewall is provided with a first thread which extends from the third inner sidewall to the first inner sidewall.

According to embodiments of the present disclosure, the second pulling part comprises a fourth inner sidewall and a fourth outer sidewall. The fourth inner sidewall is connected with the second inner sidewall, and the fourth inner sidewall is provided with a second thread which extends from the fourth inner sidewall to the second inner sidewall.

According to embodiments of the present disclosure, a specification of the first thread is as same as a specification of the second thread.

According to embodiments of the present disclosure, the first outer sidewall comprises a first groove.

According to embodiments of the present disclosure, the second outer sidewall comprises a second groove.

Embodiments of the present disclosure provide a claw comprising a pulling part, a limiting part and a connecting part connecting the pulling part and the limiting part. The limiting part comprises a main body part, a first notch part and a second notch part which are sequentially arranged in a first direction. A size of the second notch part in a second direction is larger than a size of the first notch part in the second direction, and the second direction intersects with the first direction. A size of the limiting part in the first direction and a size of the pulling part in the first direction are both larger than a size of the connecting part in the first direction. A size of the pulling part in the second direction is smaller than or equal to the size of the second notch part in the second direction.

According to embodiments of the present disclosure, the limiting part comprises a first surface connected with the connecting part and a second surface arranged opposite to the first surface. An orthographic projection of the main body part on a reference plane where the second surface is located, an orthographic projection of the first notch part on the reference plane, and an orthographic projection of the second notch part on the reference plane are combined to form a semicircle. The orthographic projection of the main body part on the reference plane overlaps with an arc side of the semicircle, and the orthographic projection of the second notch part on the reference plane overlaps with a straight line of the semicircle.

According to embodiments of the present disclosure, the orthographic projection of the second notch part on the reference plane is a rectangle, and the orthographic projection of the first notch part on the reference plane is a shape formed by a circular arc and a long side of the rectangle.

According to embodiments of the present disclosure, a size of the pulling part in a third direction is larger than ½ of a size of the connecting part in the third direction.

According to embodiments of the present disclosure, the connecting part comprises a first inner sidewall and a first outer sidewall. The first outer sidewall is connected with a surface of the main body part close to the first notch part, and the first outer sidewall is arranged opposite to the first inner sidewall.

According to embodiments of the present disclosure, the pulling part comprises a third inner sidewall and a third outer sidewall. The third inner sidewall is connected with the first inner sidewall, the third inner sidewall is arranged opposite to the third outer sidewall, and the third inner sidewall is provided with a thread which extends from the third inner sidewall to the first inner sidewall.

Embodiments of the provide disclosure provide a usage method of the above puller. The method comprises placing the first claw into a valve seat and pushing the first claw towards an edge of the valve seat; placing the second claw into the valve seat through the second notch part and pushing the second claw towards the edge of the valve seat, and assembling the first claw with the second claw. The first limiting part and the second limiting part respectively are abutted against an upper end face of the valve seat.

According to embodiments of the present disclosure, the method further comprises screwing one end of a leading screw into the puller through the first notch part, the second notch part, the third notch part and the fourth notch part, so that the one end of the leading screw is connected with the first pulling part and the second pulling part, and sleeving a hydraulic driving device onto the other end of the leading screw and fixing the hydraulic driving device by a nut.

According to embodiments of the present disclosure, the method further comprises controlling the leading screw to rotate through the hydraulic driving device, so that the first pulling part and the second pulling part drive the valve seat to move.

BRIEF DESCRIPTION OF THE DRAWINGS

In order to clearly illustrate the technical solutions of the embodiments of the present disclosure, the drawings of the embodiments will be briefly described in the following; it is obvious that the described drawings below are only related to some embodiments of the present disclosure without construing any limitation thereto.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
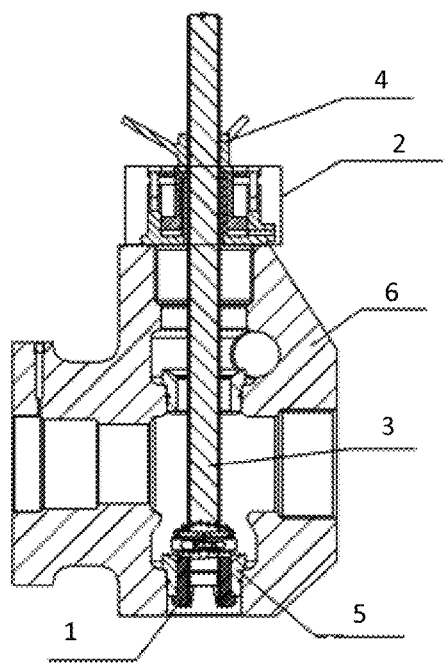
FIG. 1 illustrates a longitudinal sectional view of a puller installed on a valve seat.
Figure 2:
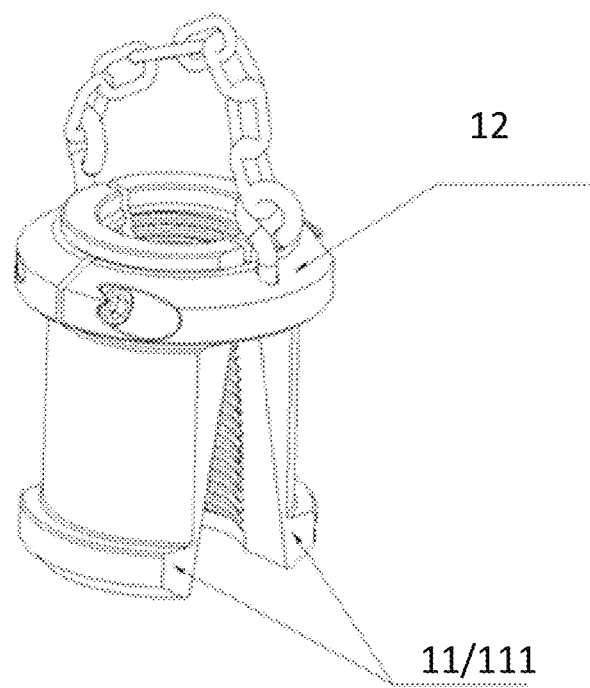
FIG. 2 illustrates a perspective view of a puller.

FIG. 1 illustrates a longitudinal sectional view of a puller installed on a valve seat, and FIG. 2 illustrates a perspective view of the puller.

As illustrated in FIG. 1, a pulling tool for disassembling the valve seat includes a puller 1, a hydraulic driving device 2, a leading screw 3, a nut 4, and the like. As illustrated in FIG. 2, the puller is composed of two parts, which are a claw 11 and a clamp 12. The claw 11 is of split type and includes two sub-claws. Opposite faces of the two sub-claws are provided with threads. The clamp 12 is configured to tightly hold the two sub-claws together. In using, the puller 1 is closed and placed into the valve seat, and then the leading screw 3 is screwed into the threads of the claw of the puller. In the process of screwing in the leading screw, the two sub-claws in the puller are gradually opened, so that a flanging 111 of the sub-claw of the puller is clamped onto a lower end face of the valve seat 5. The hydraulic driving device 2 pulls the leading screw 4 to move upwards, thus driving the valve seat 5 to be pulled out of a valve box 6.

The inventors of the present disclosure found that, when using the above-mentioned pulling tool, there are the following shortcomings or deficiencies:

(i), the claw of the puller consists of two parts which have a large gap there-between and cannot form a complete circle. Therefore, in using, the threads inside the claw may be stuck, which makes it difficult to screw in the leading screw. In the process of operation, if it is difficult to screw in the leading screw, the number of the threads engaged between the leading screw and the puller is very small. In such case, pulling the valve seat will cause serious damages to the leading screw and the threads in the puller so that the puller cannot be used any longer.

(ii), an inner diameter of an inner hole of the valve seat is fixed, and thus the flanging at the lower end of the claw of the puller cannot be thickened. This is because thickening the flanging will make it unable to place the puller into the inner hole of the valve seat. When the valve seat is pulled by using the claw with the above structure, it is easy for the tool to be damaged due to a breakage of the flanging, so the service life of the puller is short.

Embodiments of the present disclosure provide a puller, a claw, and a usage method of the puller. The puller includes two claws of split type which are arranged opposite to each other, and each of the two claws includes a pulling part, a limiting part and a connecting part for connecting the pulling part and the limiting part. In each claw, a size of the pulling part and a size of the limiting part in a first direction both are larger than that of the connecting part in the first direction. The limiting part of each claw includes a notch, and a size of the notch in a second direction is larger than that of the pulling part in the second direction. The puller and the claw disclosed in the present disclosure can prevent the thread of the puller from being damaged, and prevent the puller from being broken.

Hereinafter, the puller, the claw and the usage method of the puller provided by the embodiments of the present disclosure will be described in details with reference to the drawings.

Figure 3:
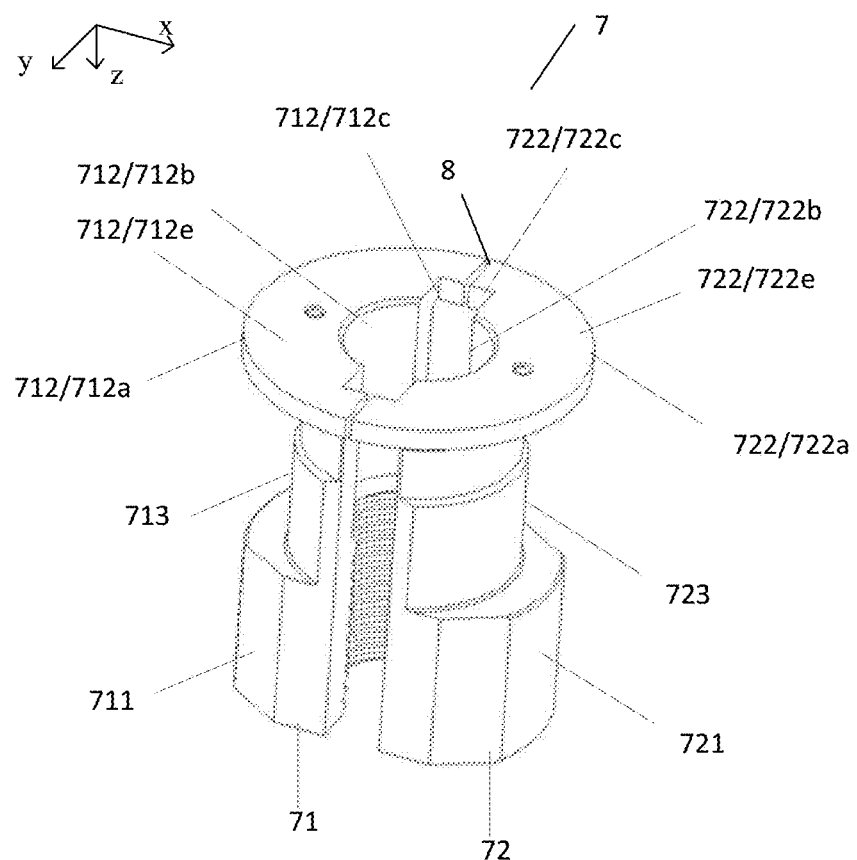
FIG. 3 illustrates a perspective view of an assembly of a first claw and a second claw according to an embodiment of the present disclosure.

An embodiment of the present disclosure provides a puller. FIG. 3 illustrates a perspective view of an assembly of a first claw and a second claw of a puller according to an embodiment of the present disclosure, FIG. 4 illustrates another perspective view of an assembly of a first claw and a second claw of a puller according to an embodiment of the present disclosure, FIG. 5 illustrates a perspective view of an assembling process of a first claw and a second claw of a puller according to an embodiment of the present disclosure, FIG. 6 illustrates a longitudinal sectional view of an assembly of a first claw and a second claw according to an embodiment of the present disclosure, FIG. 7a illustrates a schematic diagram of a projection of a first claw and a second claw according to an embodiment of the present disclosure, and FIG. 7b illustrates another schematic diagram of a projection of a first claw and a second claw according to an embodiment of the present disclosure.

Figure 4:
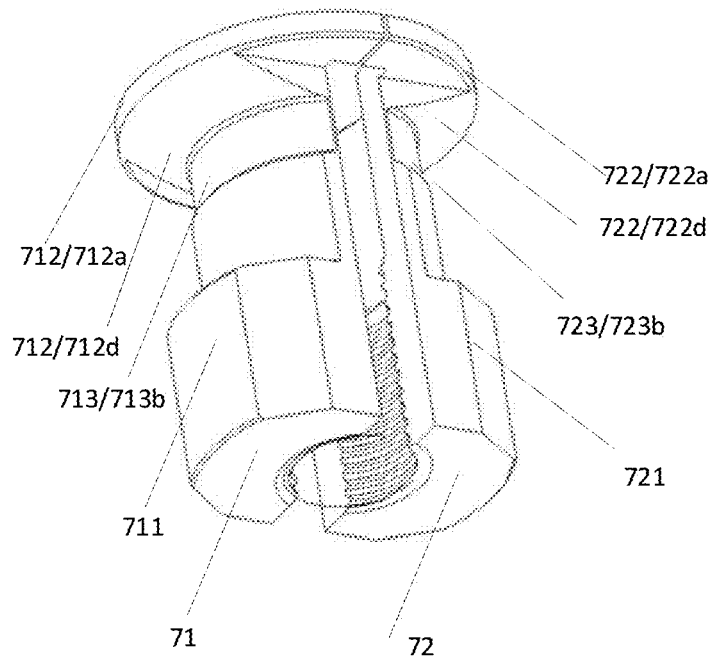
FIG. 4 illustrates another perspective view of an assembly of a first claw and a second claw according to an embodiment of the present disclosure.
Figure 5:
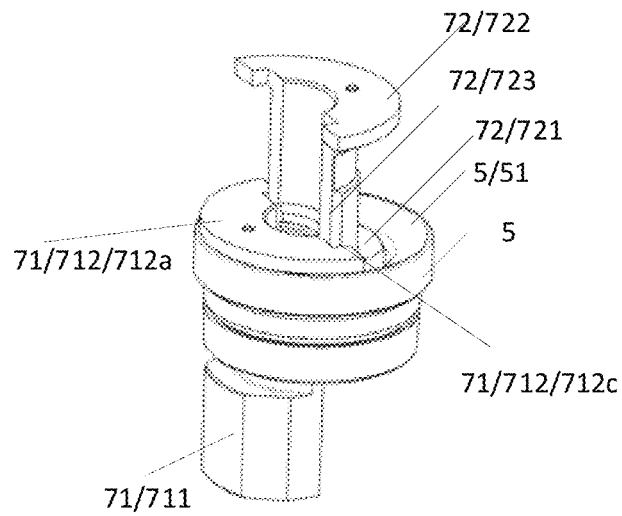
FIG. 5 illustrates a perspective view of an assembling process of a first claw and a second claw according to an embodiment of the present disclosure.

As illustrated in FIGS. 3 and 4, the puller 7 of the embodiment of the present disclosure includes a first claw 71 and a second claw 72 which are arranged opposite to each other. The first claw 71 includes a first pulling part 711, a first limiting part 712, and a first connecting part 713 connecting the first pulling part 711 and the first limiting part 712. The first limiting part 712 includes a first body part 712a, a first notch part 712b and a second notch part 712c. The first notch part 712b is located on one side of the first body part 712a close to the second claw 72 in a first direction x, and the second notch part 712c is located on one side of the first notch part 712b away from the first body part 712a in the first direction x. As illustrated in FIG. 3, a size of the second notch part 712c in a second direction y is larger than that of the first notch part 712b in the second direction y, and the second direction y intersects with the first direction x. For example, the first direction x may be perpendicular to the second direction y.

As illustrated in FIGS. 3 and 4, the second claw 72 includes a second pulling part 721, a second limiting part 722 and a second connecting part 723 connecting the second pulling part 721 and the second limiting part 722. The second limiting part 722 includes a second body part 722a, a third notch part 722b and a fourth notch part 722c. The third notch part 722b is located on one side of the second body part 722a close to the first claw 71 in the first direction x. The fourth notch part 722c is located on one side of the third notch part 722b away from the second body part 722a in the first direction x, and a size of the fourth notch part 722c in the second direction y is larger than that of the third notch part 722b in the second direction y.

Figure 6:
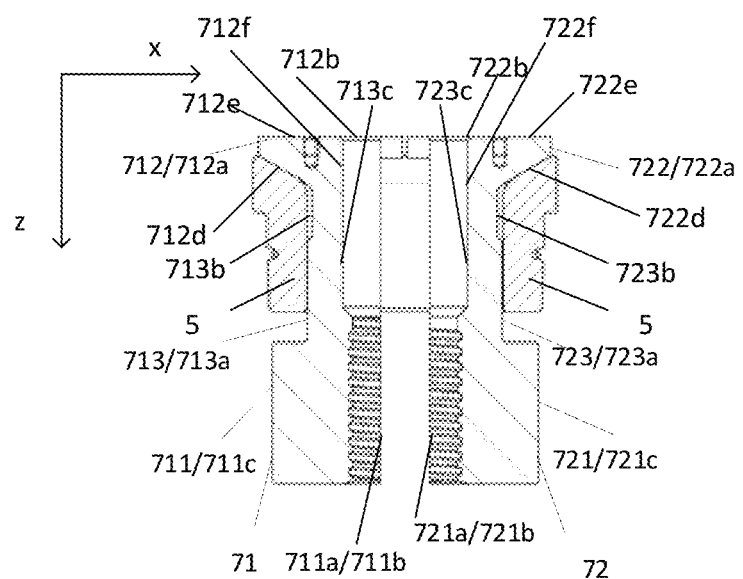
FIG. 6 illustrates a longitudinal sectional view of an assembly of a first claw and a second claw according to an embodiment of the present disclosure.
Figure 7A:
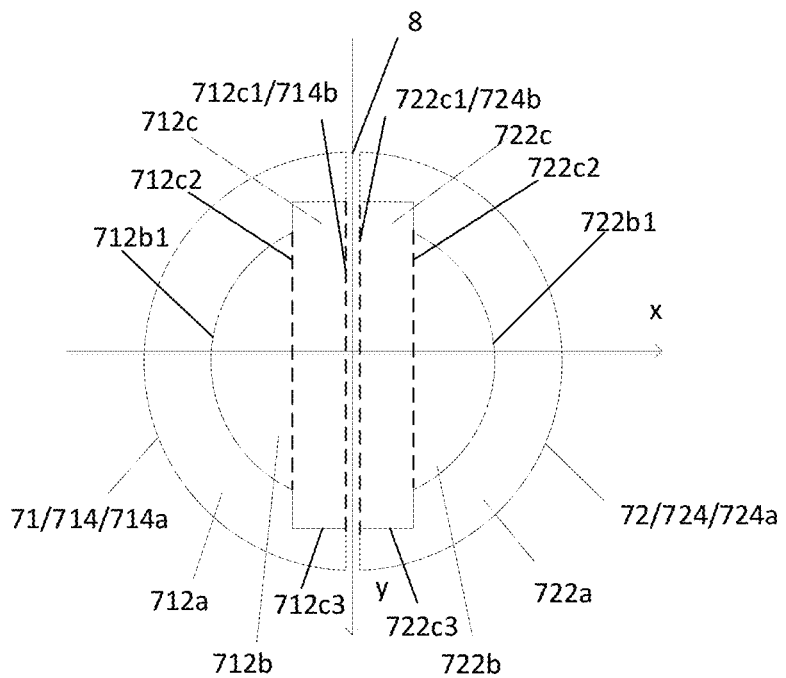
FIG. 7a illustrates a schematic diagram of a projection of a first claw and a second claw according to an embodiment of the present disclosure.
Figure 7B:
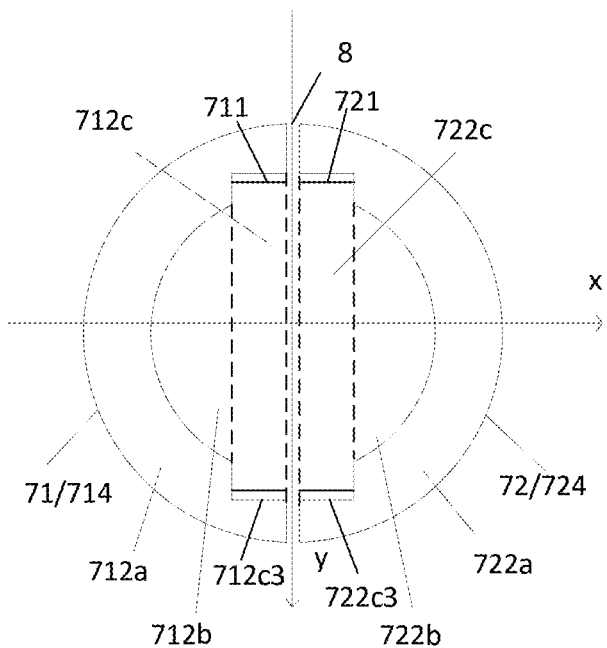
FIG. 7b illustrates another schematic diagram of a projection of a first claw and a second claw according to an embodiment of the present disclosure.

As illustrated in FIG. 6, a size of the first limiting part 712 in the first direction x and a size of the first pulling part 711 in the first direction x both are larger than that of the first connecting part 713 in the first direction x. A size of the second limiting part 722 in the first direction x and a size of the second pulling part 721 in the first direction x both are larger than that of the second connecting part 723 in the first direction x. As illustrated in FIG. 5, FIG. 7a and FIG. 7b, a size of the second pulling part 721 in the second direction y is smaller than or equal to that of the second notch part 722b in the second direction y. In the puller provided by the embodiment of the present disclosure, because the size of the second pulling part in the second direction is smaller than or equal to that of the second notch part in the second direction, firstly, the first claw can be placed into an inner hole of a valve seat to be taken out; then the second claw can be placed into the inner hole of the valve seat to be taken out through the second notch part; and then the first limiting part of the first claw is aligned with the second limiting part of the second claw; and then a leading screw is inserted between the first claw and the second claw so as to push apart the first pulling part of the first claw and the second pulling part of the second claw, and is engaged with the first pulling part and the second pulling part through threads; finally, the valve seat to be taken out is taken out through an upward movement of the leading screw. It can be seen that, the puller provided by the embodiment of the present disclosure has at least the following advantages:

(i) A clamp is not required in the puller, which is convenient to operate on the one hand and can reduce the cost on the other hand;

(ii) A clamp is not required in the puller and the puller can be limited by attaching the first limiting part of the first claw and the second limiting part of the second claw onto an upper end face of the valve seat, so as to avoid a disordered engagement of the threads;

(iii) Because the size of the second pulling part in the second direction is smaller than or equal to that of the second notch part in the second direction, the second pulling part can be installed vertically and downwardly, so that the second pulling part can be made thicker, thereby improving the strength of the second pulling part, reducing the risk of breakage, and greatly prolonging the service life.

FIG. 7a illustrates the case where the size of the second pulling part 721 in the second direction y is equal to the size of the second notch part 712c in the second direction y. In this case, an orthographic projection of a portion of the second pulling part 721 along the second direction y on a plane defined by the first direction x and the second direction y coincides with an orthographic projection of a short side 722c3 of the fourth notch part 722c on the plane defined by the first direction x and the second direction y; and a short side 712c3 of the second notch part 712c is aligned with a short side of the fourth notch part 722c in this plane. FIG. 7b illustrates the case where the size of the second pulling part 721 in the second direction y is smaller than the size of the second notch part 712c in the second direction y. In this case, an orthographic projection of a portion of the second pulling part 721 along the second direction y on the plane defined by the first direction x and the second direction y is located within an orthographic projection of the fourth notch part 722c on the plane defined by the first direction x and the second direction y; and a short side 712c3 of the second notch part 712c is aligned with a short side 722c3 of the fourth notch part 722c in this plane. According to an embodiment of the present disclosure, the puller of the present disclosure includes two claws. The first claw and the second claw can be paired for process and usage. Each claw includes three parts, which are a limiting part at an upper end, a connecting part located at the middle, and a pulling part at a lower end. The two claws of the puller of the present embodiment are of split type. Because the sizes of the first limiting part and the first pulling part in the first direction both are larger than that of the first connecting part in the first direction, and because the sizes of the second limiting part and the second pulling part in the first direction both are larger than that of the second connecting part in the first direction, when the puller is placed in the inner hole of the valve seat to be pulled, the valve seat can be sleeved onto the first connecting part and the second connecting part, and the first limiting part and the second limiting part can limit the puller onto the valve seat, as illustrated in FIG. 5. In the puller of the embodiment of the present disclosure, because the size of the second pulling part in the second direction is smaller than or equal to the size of the second notch part in the second direction, the second claw can be placed into the inner hole of the valve seat through the second notch part of the first claw when the first claw is placed into the inner hole of the valve seat. In this way, the first claw and the second claw are of split type and are respectively placed in the valve seat. A clamp is not required in the puller of the embodiment of the present disclosure, and the first claw and the second claw are convenient to be assembled and disassembled and have lower cost. The puller of the present disclosure can be applied for a valve seat in a hydraulic end of a plunger pump.

In some embodiments, as illustrated in FIG. 5, the sizes of the second connecting part 723 and the second pulling part 721 in the second direction y are both smaller than or equal to the size of the second notch part 712c in the second direction y.

In some embodiments, as illustrated in FIGS. 3 and 4, the size of the first limiting part 712 in the second direction y is larger than that of the first connecting part 713 in the second direction y, and the size of the second limiting part 722 in the second direction y is larger than that of the second connecting part 723 in the second direction y.

In some embodiments, for example, as illustrated in FIG. 7a, the first direction x may be perpendicular to a direction of a long side 712c1 of the second notch part 712c. The second direction y may be a direction perpendicular to the first direction x. The first limiting part 712 and the second limiting part 722 extend on the plane defined by the first direction x and the second direction y. For example, the first limiting part 712 extends in a direction away from the second claw 72, and the second limiting part 722 extends in a direction away from the first claw 71.

In some embodiments, the first claw 71 and the second claw 72 have the same shape and the same size, and the size of the first pulling part 711 in the second direction y is smaller than or equal to the size of the fourth notch part in the second direction y.

FIG. 7a illustrates the case where the size of the first pulling part 711 in the second direction y is equal to the size of the fourth notch part 722c in the second direction y. In this case, the orthographic projection of the portion of the first pulling part 711 along the second direction y on the plane defined by the first direction x and the second direction y coincides with the orthographic projection of the short side 712c3 of the second notch part 712c on the plane defined by the first direction x and the second direction y; and the short side 722c3 of the fourth notch part 722c is aligned with the short side of the second notch part 712c in this plane. FIG. 7b illustrates the case where the size of the first pulling part 711 in the second direction y is smaller than the size of the fourth notch part 722c in the second direction y. In this case, the orthographic projection of the portion of the first pulling part 711 along the second direction y on the plane defined by the first direction x and the second direction y is located within the orthographic projection of the second notch part 712c on the plane defined by the first direction x and the second direction y; and the short side 722c3 of the fourth notch part 722c is aligned with the short side 712c3 of the second notch part 712c in this plane.

According to an embodiment of the present disclosure, the first claw and the second claw have the same shape and the same size. In this way, when the valve seat is pulled by the puller of the embodiment of the present disclosure, the two claws of the puller of the embodiment of the present disclosure are uniformly stressed and are not easily damaged, and the valve seat being pulled is also uniformly stressed and is not easily damaged. According to the embodiment of the present disclosure, as described above, because the size of the second pulling part in the second direction is smaller than or equal to the size of the second notch part in the second direction, the first claw can be placed into the inner hole of the valve seat firstly, and then the second claw can be placed into the inner hole of the valve seat through the second notch part. Similarly, because the size of the first pulling part in the second direction is smaller than or equal to the size of the fourth notch part in the second direction, the second claw can be placed into the inner hole of the valve seat firstly, and then the first claw can be placed into the inner hole of the valve seat through the fourth notch part. On the other hand, the first claw and the second claw can be replaced with each other, so that the maintenance cost of the puller can be reduced.

In some embodiments, as illustrated in FIGS. 3, 4 and 7a, the first limiting part 712 may include a first surface 712d connected with the first connecting part 713 and a second surface 712e arranged opposite to the first surface 712d. As illustrated in FIG. 7a, an orthographic projection of the first body part 712a on a first reference plane (e.g., a plane defined by the first direction x and the second direction y) where the second surface 712e is located, an orthographic projection of the first notch part 712b on the first reference plane, and an orthographic projection of the second notch part 712c on the first reference plane are combined to form a first semicircle 714. The orthographic projection of the first body part 712a on the first reference plane overlaps with an arc side 714a of the first semicircle 714, and the orthographic projection of the second notch part 712b on the first reference plane overlaps with a straight line 714b of the first semicircle 714.

In some embodiments, as illustrated in FIGS. 3, 4 and 7a, the second limiting part 722 may include a third surface 722d connected with the second connecting part 723 and a fourth surface 722e arranged opposite to the third surface 722d. An orthographic projection of the second body part 722a on a second reference plane (e.g., a plane defined by the first direction x and the second direction y) where the third surface 722d is located, an orthographic projection of the third notch part 722b on the second reference plane, and an orthographic projection of the fourth notch part 722e on the second reference plane are combined to form a second semicircle 724. The orthographic projection of the second body part 722a on the second reference plane overlaps with an arc side 724a of the second semicircle 724, and the orthographic projection of the fourth notch part 722c on the second reference plane overlaps with a straight line 724b of the second semicircle 724.

In some embodiments, as illustrated in FIG. 7b, the first semicircle 714 and the second semicircle 724 are configured to be combined into a complete circle.

According to the embodiment of the present disclosure, because the leading screw is required to be threadedly connected with the threads of the first claw and the second claw through the space formed by the first and second notch parts of the first claw and the third and fourth notch parts of the second claw, when the first claw is assembled with the second claw, i.e., when the first semicircle 714 and the second semicircle 724 constitute a complete circle, a gap 8 may be formed between the limiting part of the first claw and the limiting part of the second claw, as illustrated in FIGS. 3, 7a and 7b.

In some embodiments, for example, as illustrated in FIG. 6, the second surface 712e and the fourth surface 722e may be located in the same plane. That is, the upper end of the first claw is aligned with the upper end of the second claw, i.e., the first reference plane and the second reference plane may be located in the same plane (for example, a plane defined by the first direction x and the second direction y).

In some embodiments, for example, as illustrated in FIGS. 3, 4 and 6, when the first claw is assembled with the second claw, the first limiting part, the first connecting part and the first pulling part of the first claw are respectively aligned with the second limiting part, the second connecting part and the second pulling part of the second claw.

In some embodiments, for example, as illustrated in FIGS. 5 and 6, an angle between the first surface 712d and the first reference plane may be as same as an angle between an upper end face 51 (which may be a conical surface) of the valve seat and the first reference plane; and an angle between the third surface 722a and the second reference plane may be as same as an angle between the upper end face 51 of the valve seat and the second reference plane. In this way, the puller can be limited by attaching the first surface and the third surface onto the upper end face of the valve seat, respectively.

According to an embodiment of the present disclosure, the orthographic projections of the first body part, the first notch part and the third notch part can constitute a first semicircle; the orthographic projections of the second body part, the third notch part and the fourth notch part can constitute a second semicircle; and the first semicircle and the second semicircle can constitute a complete circle. In this way, when the first claw is assembled with the second claw, by abutting the first surface of the first limiting part of the first claw and the third surface of the second limiting part of the second claw against the upper end face of the valve seat to constitute a complete circle during the process of placing the first claw and the second claw into the inner hole of the valve seat, the limiting function of the first limiting part and the second limiting part can be implemented. Therefore, the first claw and the second claw of the embodiment of the present disclosure have no need of an additional clamp, which at least simplifies the manufacturing process of the puller and reduces the cost.

In some embodiments, as illustrated in FIG. 7a, an orthographic projection of the second notch part 712c on the first reference plane is a first rectangle, and an orthographic projection of the first notch part 712b on the first reference plane is a shape formed by a first circular arc 712b1 and a long side 712c2 of the first rectangle. The dashed lines in FIGS. 7a and 7b are shown for clearly illustrating the shapes of the first notch part and the second notch part.

In some embodiments, an orthographic projection of the fourth notch part 722c on the second reference plane is a second rectangle, and an orthographic projection of the third notch part 722b on the second reference plane is a shape formed by a second circular arc 722b1 and a long side 722c2 of the second rectangle. The dashed lines in FIGS. 7a and 7b are shown for clearly illustrating the shapes of the third notch part and the fourth notch part.

According to the embodiment of the present disclosure, the space formed by the first notch part, the second notch part, the third notch part and the fourth notch part allows the leading screw to pass there-through for threaded connection with the threads of the first pulling part and the second pulling part. The circle formed by the first circular arc of the first notch part and the second circular arc of the third notch part in the embodiment of the present disclosure can be matched with a cross section of the leading screw. For example, a radius of a circle formed by the first circular arc of the first notch part and the second circular arc of the third notch part is greater than or equal to a radius of the cross section of the leading screw. For example, the second notch part and the fourth notch part in the embodiment of present disclosure may have a rectangular shape, so that the second pulling part of the second claw whose size is equal to or smaller than that of the second notch part in the second direction y can pass through the second notch part to be assembled with the first claw under the circumstance that the first claw is arranged in the inner hole of the valve seat, or the first pulling part of the first claw whose size is equal to or smaller than that of the fourth notch part in the second direction can pass through the fourth notch part to be assembled with the second claw under the circumstance that the second claw is arranged in the inner hole of the valve seat. A rectangular shape is convenient for processing in the manufacturing process, so it is easy to control the sizes of the second notch part and the fourth notch part in the second direction. Therefore, the puller of the present disclosure is simpler and easier to be implemented in terms of technology.

According to an embodiment of the present disclosure, the shape of the second notch part and the shape of the fourth notch part may be a first rectangle and a second rectangle, respectively, and the two rectangles have the same size. For example, a long side 712c1 of the first rectangle and a long side 722c1 of the second rectangle have the same length. In this way, by aligning short sides 712c3 of the first rectangle with short sides 722c3 of the second rectangle in the plane defined by the first direction x and the second direction y, the first limiting part and the second limiting part can form a complete circle, thereby achieving the limiting functions of the first limiting part and the second limiting part.

In some embodiments, as illustrated in FIG. 6, the first connecting part 713 includes a first inner sidewall 713c and a first outer sidewall 713a, the first inner sidewall 713c is connected with a surface 712f of the first body part 712a close to the first notch part 712b, and the first outer sidewall 713a is arranged opposite to the first inner sidewall 713c.

According to an embodiment of the present disclosure, as illustrated in FIG. 6, the second connecting part 723 includes a second inner sidewall 723c and a second outer sidewall 723a, the second inner sidewall 723c is connected with a surface 722f of the second body part 722a close to the third notch part 722b, and the second outer sidewall 723a is arranged opposite to the second inner sidewall 723c.

In some embodiments, as illustrated in FIG. 6, the first pulling part 711 includes a third inner sidewall 711a and a third outer sidewall 711c, the third inner sidewall 711a is connected with the first inner sidewall 713c and is arranged opposite to the third outer sidewall 711c. The third inner sidewall 711a is provided with a first thread 711b which extends from the third inner sidewall 711a to the first inner sidewall 713c.

In some embodiments, as illustrated in FIG. 6, the second pulling part 721 includes a fourth inner sidewall 721a and a fourth outer sidewall 721c, and the fourth inner sidewall 721a is connected with the second inner sidewall 723c. The fourth inner sidewall 721a is provided with a second thread 721b which extends from the fourth inner sidewall 721a to the second inner sidewall 723c.

In some embodiments, for example, the first inner sidewall 713c and the second inner sidewall 723c are perpendicular to the second surface 712e, and the first outer sidewall 713a and the second outer sidewall 723a are perpendicular to the second surface 712e. For example, the third inner sidewall 711a and the fourth inner sidewall 721a are perpendicular to the fourth surface 722e; and the third outer sidewall 711c and the fourth outer sidewall 721c are perpendicular to the second surface 712e. For example, the second surface 712e and the fourth surface 722e both coincide with the plane defined by the first direction x and the second direction y.

In some embodiments, for example, the third outer sidewall 711c is farther away from the second claw 72 than the first outer sidewall 713a, and the upper end of the third outer sidewall 711c is connected with the lower end of the first outer sidewall 713a to form a stepped structure, so that the valve seat is stressed when being pulled by using the puller. For example, the fourth outer sidewall 721c is farther away from the first claw 71 than the second outer sidewall 723a, and the upper end of the fourth outer sidewall 721c is connected with the lower end of the second outer sidewall 723a to form a stepped structure, so that the valve seat is stressed when being pulled by using a puller.

In some embodiments, the specification of the first thread 711b is as same as that of the second thread 721b. For example, the nominal diameter, the number of threads, the helical pitch, the screw lead, and the rotation direction of the first thread are as same as those of the second thread.

According to the embodiment of the present disclosure, the specification of the first thread is as same as that of the second thread in the embodiment of the present disclosure, so that the leading screw provided with screws can be in threaded connection with the first claw and the second claw.

According to the embodiment of the present disclosure, because a clamp is not required in the puller of the present disclosure and the puller of the present disclosure is limited by abutting the limiting parts against the upper end face of the valve seat, the gap between the first claw and the second claw is small, and more threads of the leading screw are engaged with the threads of the claws, so as to prevent from random engagement of the threads.

In some embodiments, as illustrated in FIGS. 4 and 6, the first outer sidewall 713*a* includes a first groove 713*b*.

In some embodiments, as illustrated in FIGS. 4 and 6, the second outer sidewall 723*a* includes a second groove 723*b*.

In some embodiments, for example, as illustrated in FIGS. 4 and 6, the first groove 713*b* may be connected with the first surface 712*d*, and the second groove 723*b* may be connected with the third surface 722*d*. For example, as illustrated in FIGS. 4 and 6, the first groove 713*b* may extend in parallel to the second surface 712*e*, and the second groove 723*b* may extend along the fourth surface 722*e*.

According to the embodiment of the present disclosure, because the first connecting part is provided with the first groove and the second connecting part is provided with the second groove, when the inner wall of the valve seat is damaged or burred, the first groove and the second groove do not interfere with the burred, so that the puller for the valve seat can be installed and pulled smoothly.

According to an embodiment of the present disclosure, as illustrated in FIG. 6, the size of the first pulling part 711 in the third direction z is larger than ½ of that of the first connecting part 713 in the third direction z, and the size of the second pulling part 721 in the third direction z is larger than ½ of that of the second connecting part 723 in the third direction z.

According to the embodiment of the present disclosure, the first claw and the second claw of the puller in the present disclosure are limited in the inner hole of the valve seat by using the first limiting part and the second limiting part without an additional clamp, and the first claw and the second claw are respectively placed in the inner hole of the valve seat. In this way, the first pulling part of the first claw and the second pulling part of the second claw of the present disclosure can be made thicker, and the first thread and the second thread are respectively arranged at the first pulling part and the second pulling part, so that the stressed position is transferred to the pulling parts when the puller is used for pulling, thus ensuring that the pulling part of the claw does not be broken during pulling. Moreover, because the pulling part of the present disclosure can be thickened, the service life of the puller of the present disclosure is prolonged.

Figure 8:
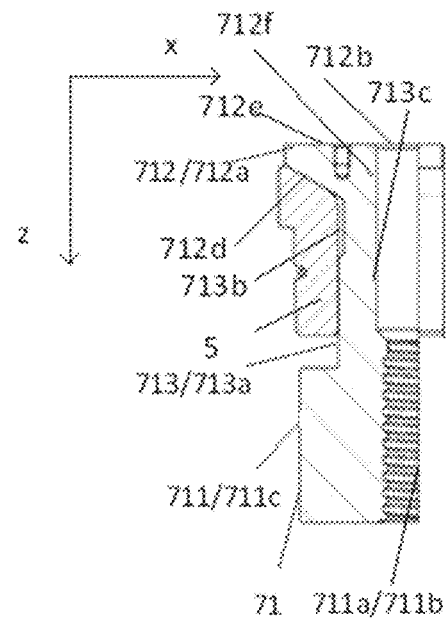
FIG. 8 illustrates a longitudinal sectional view of a claw according to an embodiment of the present disclosure.
Figure 9A:
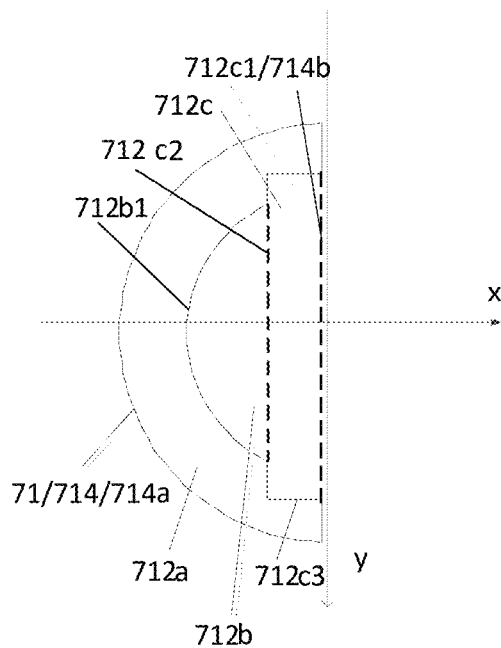
FIG. 9a illustrates a schematic diagram of a projection of a claw according to an embodiment of the present disclosure.
Figure 9B:
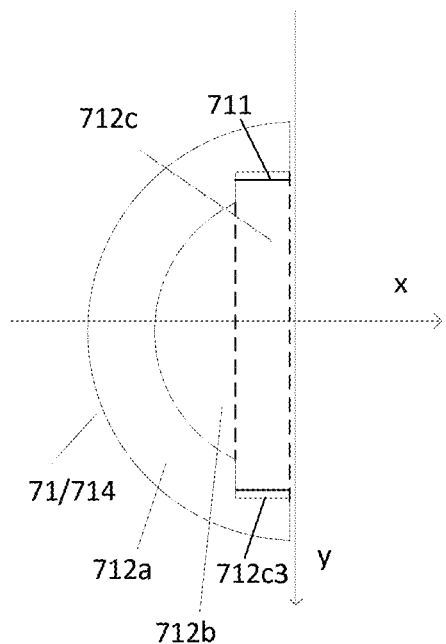
FIG. 9b illustrates another schematic diagram of a projection of a claw according to an embodiment of the present disclosure.

Embodiments of the present disclosure provide a claw. FIG. 8 illustrates a longitudinal sectional view of a claw according to an embodiment of the present disclosure, FIG. 9*a* illustrates a schematic diagram of a projection of a claw on a reference plane according to an embodiment of the present disclosure, and FIG. 9*b* illustrates another schematic diagram of a projection of a claw on a reference plane according to an embodiment of the present disclosure.

Embodiments of the present disclosure provide a claw. As illustrated in FIG. 8, the claw includes a pulling part 711, a limiting part 712 and a connecting part 713 connecting the pulling part 711 and the limiting part 712. As illustrated in FIG. 9*a*, the limiting part 712 includes a main body part 712*a*, a first notch part 712*b* and a second notch part 712*c*. The main body part 712*a*, the first notch part 712*b*, and the second notch part 712*c* are sequentially arranged in the first direction x. The size of the second notch part 712*c* in the second direction y is larger than that of the first notch part 712*b* in the second direction y. The second direction y intersects with the first direction x. For example, the second direction y is perpendicular to the first direction x.

As illustrated in FIG. 8, the size of the limiting part 712 and the size of the pulling part 711 in the first direction x are both larger than that of the connecting part 713 in the first direction x. As illustrated in FIGS. 9*a* and 9*b*, the size of the pulling part 711 in the second direction y is smaller than or equal to that of the second notch part 712*c* in the second direction y.

According to the embodiment of the present disclosure, the claw includes three parts, which are a limiting part at the upper end, a connecting part at the middle, and a pulling part at the lower end. The two claws of the embodiment of the present disclosure can constitute a puller. Because the sizes of the limiting part and the pulling part in the first direction are both larger than that of the connecting part in the first direction, when the claw is placed in the inner hole of the valve seat to be pulled, the limiting part can limit the claw on the valve seat. In the embodiment of the present disclosure, because the size of the pulling part in the second direction y is smaller than or equal to that of the second notch part 712*c* in the second direction y, one claw can be placed into the inner hole of the valve seat to be pulled through the second notch part of the other claw under the circumstance that the other claw has been placed in the inner hole of the valve seat. Then the limiting parts of the two claws are aligned, a leading screw is inserted between the two claws to push apart the pulling parts of the two claws and is engaged with the pulling parts through threads. Finally, the valve seat to be taken out is taken out through an upward movement of the leading screw. In this way, the two claws of the embodiment of the present disclosure are respectively placed in the valve seat without a clamp, and the two claws are convenient to be disassembled and assembled with lower cost. Moreover, the limiting parts of the two claws are abutted against the upper end face of the valve seat to implement achieve a limiting function, so that the random engagement of the threads can be avoided. Additionally, because the size of the pulling part in the second direction is smaller than or equal to that of the second notch part in the second direction, the pulling part can be installed vertically and downwardly, so that it can be made thicker, thereby improving the strength of the pulling part, reducing the risk of breakage and greatly prolonging the service life.

FIG. 9*a* illustrates the case where the size of the pulling part 711 in the second direction y is equal to the size of the second notch part 712*c* in the second direction y. In this case, an orthographic projection of a portion of the short side 712*c*3 of the second notch part 712*c* in the second direction on a plane defined by x and y coincides with an orthographic projection of the pulling part 711 on this plane. FIG. 9*b* illustrates the case where the size of the pulling part 711 in the second direction y is smaller than that of the second notch part 712*c* in the second direction y. In this case, an orthographic projection of a portion of the pulling part 711 in the second direction y on the plane defined by x and y is located within the orthographic projection of the second notch part 712*c* on this plane.

In some embodiments, as illustrated in FIG. 8, the limiting part 712 includes a first surface 712*d* connected with the connecting part 711, and a second surface 712*e* arranged opposite to the first surface 712*d*. As illustrated in FIGS. 9*a* and 9*b*, an orthographic projection of the main body part 712*a* on a reference plane (e.g., a plane defined by x and y) where the second surface 712*e* is located, an orthographic projection of the first notch part 712*b* on the reference plane, and an orthographic projection of the second notch part 712*c* on the reference plane are combined to form a semicircle 714. An orthographic projection of the main body part 712*a* on the reference plane overlaps with an arc side 714*a* of the semicircle, and the orthographic projection of the second notch part 712c on the reference plane overlaps with a straight line 714b of the semicircle. The dashed lines in FIGS. 9a and 9b are shown for clearly illustrating the shapes of the first notch part and the second notch part.

According to the embodiment of the present disclosure, the orthographic projections of the limiting part, the first notch part and the second notch part of the claw can constitute a semicircle. In this way, the limiting parts of the two claws can form a complete circle, so that when the two claws are assembled, the first surface of the limiting part of one claw and the first surface of the limiting part of the other claw are abutted against the upper end face of the valve seat (the upper end face can be a conical surface) and spliced together into a complete circle to achieve the limiting function of the two limiting parts. Therefore, when the valve seat is pulled by using the two claws of the embodiment of the present disclosure, an additional clamp is not required, which at least simplifies the manufacturing process of the claws.

In some embodiments, as illustrated in FIG. 9a, the orthographic projection of the second notch part 712c on the reference plane is a rectangle, and the orthographic projection of the first notch part 712b on the reference plane is a shape formed by a circular arc 712b1 and a long side 712c2 of the rectangle.

According to the embodiment of the present disclosure, in the case where the two claws are assembled together, a space formed by the first notch parts and the second notch parts of the two claws allows the leading screw to pass therethrough for a threaded connection with the threads of the two pulling parts. According to the embodiment of the present disclosure, the circle formed by the circular arcs of the first notch parts of the two claws can be matched with the cross section of the leading screw. For example, a radius of the circle formed by the circular arcs of the two first notch parts is greater than or equal to a radius of the cross section of the leading screw. For example, the shape of the second notch part of the claw in the embodiment of the present disclosure may be a rectangle, so that one claw having a limiting part whose size in the second direction y is smaller than that of the second notch part of the other claw can pass through the second notch part of the other claw so as to be assembled with the other claw under the circumstance that the other claw has been arranged in the inner hole of the valve seat.

According to an embodiment of the present disclosure, the shape of the second notch part may be a first rectangle. In this way, by aligning the short sides of the two first rectangles of the two claws in the plane defined by the first direction x and the second direction y, the two limiting parts can form a complete circle so as to achieve the limiting function of the two limiting parts in the inner hole of the valve seat.

In an embodiment, as illustrated in FIG. 8, the connecting part 713 includes a first inner sidewall 713c and a first outer sidewall 713a, the first inner sidewall 713c is connected with the surface 712f of the main body part 712a close to the first notch part 712b, and the first outer sidewall 713a is arranged opposite to the first inner sidewall 713c.

In some embodiments, as illustrated in FIG. 8, the pulling part 711 includes a third inner sidewall 711a and a third outer sidewall 711c, the third inner sidewall 711a is connected with the first inner sidewall 713c and is arranged opposite to the third outer sidewall 711c. The third inner sidewall 711a is provided with threads 711b which extend from the third inner sidewall 711a to the first inner sidewall 713c.

In some embodiments, for example, as illustrated in FIG. 8, the first inner sidewall 713c and the second inner sidewall 711a are perpendicular to the second surface 712e; and the first outer sidewall 713a and the second outer sidewall 711c are perpendicular to the second surface 712e. For example, the second surface 712e may be in a plane defined by the first direction x and the second direction y.

In some embodiments, for example, as illustrated in FIG. 8, the third outer sidewall 711c is farther away from the threads extending from the third inner sidewall 711a to the first inner sidewall 713c than the first outer sidewall 713a, and the upper end of the third outer sidewall 711c is connected with the lower end of the first outer sidewall 713a to form a stepped structure, so that the valve seat is stressed when being pulled by a puller.

According to an embodiment of the present disclosure, two claws of the present disclosure constitute a puller. No additional clamp is required in the puller, and the puller is limited by abutting the limiting parts of the claws against the upper end face of the valve seat. The gap between the two claws is small, and more threads of the leading screw are engaged with the threads of the claws, thereby ensuring to avoid disordered engagement of the threads.

In some embodiments, as illustrated in FIG. 8, the first outer sidewall 713a includes a groove 713b.

In some embodiments, for example, the groove 713b may be connected with the first surface 712d, and the groove 713b may extend in parallel to the second surface 712e.

According to the embodiment of the present disclosure, because the connecting part is provided with a groove, when the inner wall of the valve seat is damaged or burred, the groove does not interfere with the burred, so that the claw for the valve seat can be installed and pulled smoothly.

In some embodiments, as illustrated in FIG. 8, the size of the pulling part 711 in the third direction z is larger than ½ of the size of the connecting part 713 in the third direction z.

According to the embodiment of the present disclosure, the two claws of the embodiment of the present disclosure can constitute a puller, and the limiting parts of the two claws limit the puller in the inner hole of the valve seat without an additional clamp. The two claws in the embodiments of the present disclosure are respectively placed in the inner hole of the valve seat. In this way, the pulling parts of the claws of the present disclosure can be made thicker and the threads are respectively arranged at the pulling parts, so that the stressed position is transferred to the pulling parts when the puller constituted by the two claws is used for pulling, thereby avoiding a breakage of the pulling parts of the claws during pulling.

Figure 10:
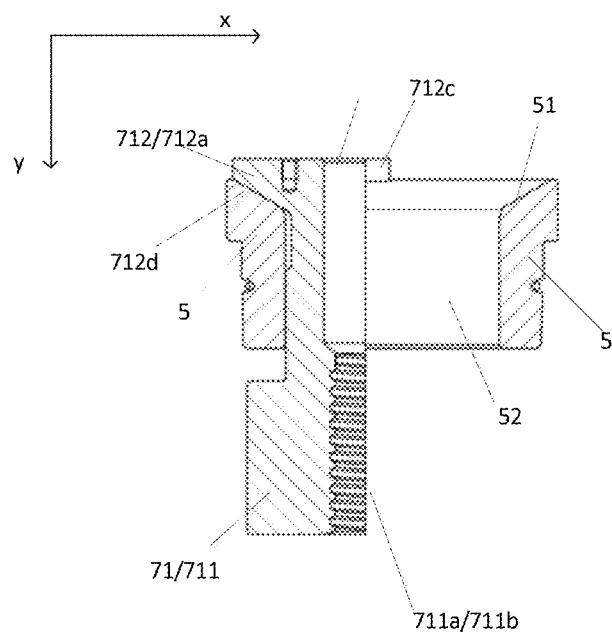
FIG. 10 illustrates a longitudinal sectional view of one claw attached onto a valve seat according to an embodiment of the present disclosure.
Figure 11:
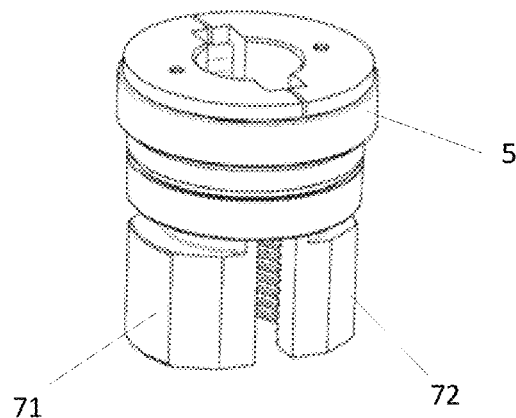
FIG. 11 illustrates a perspective view of two claws limited on a valve seat according to an embodiment of the present disclosure.
Figure 12:
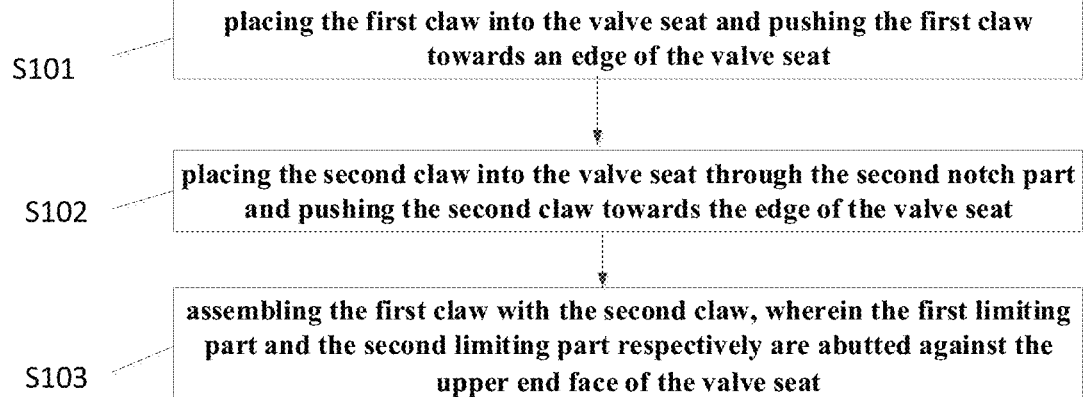
FIG. 12 illustrates a flowchart of a usage method of a puller according to an embodiment of the present disclosure.

The embodiments of the present disclosure provide a usage method of the above-described puller. FIG. 10 illustrates a longitudinal sectional view of a claw according to an embodiment of the present disclosure which is abutted against a valve seat; FIG. 11 illustrates a perspective view of two claws according to an embodiment of the present disclosure which are limited on a valve seat; FIG. 12 illustrates a flowchart of a usage method of a puller according to an embodiment of the present disclosure; and FIG. 13 illustrates a longitudinal sectional view of a puller according to an embodiment of the present disclosure which is installed on a valve seat.

As illustrated in FIG. 12, the usage method 100 of the above-mentioned puller provided by the embodiment of the present disclosure includes: S101, placing the first claw 71 into an inner hole 52 of a valve seat 5 in a valve box 6 and pushing the first claw 71 towards an edge of the valve seat 5, as illustrated in FIGS. 10 and 13; S102, placing the second claw 72 into the inner hole 52 of the valve seat 5 through the second notch part 712c, and pushing the second claw 72 towards the edge of the valve seat 5, as illustrated in FIG. 5; S103, assembling the first claw 71 with the second claw 72 so that, for example, the first semicircle and the second semicircle are combined into a complete circle. The first limiting part and the second limiting part are abutted against the upper end face 51 of the valve seat 5, for example, the first surface 712d and the third surface 722d are respectively abutted against the upper end face 51 of the valve seat 5, as illustrated in FIGS. 6 and 11.

Figure 13:
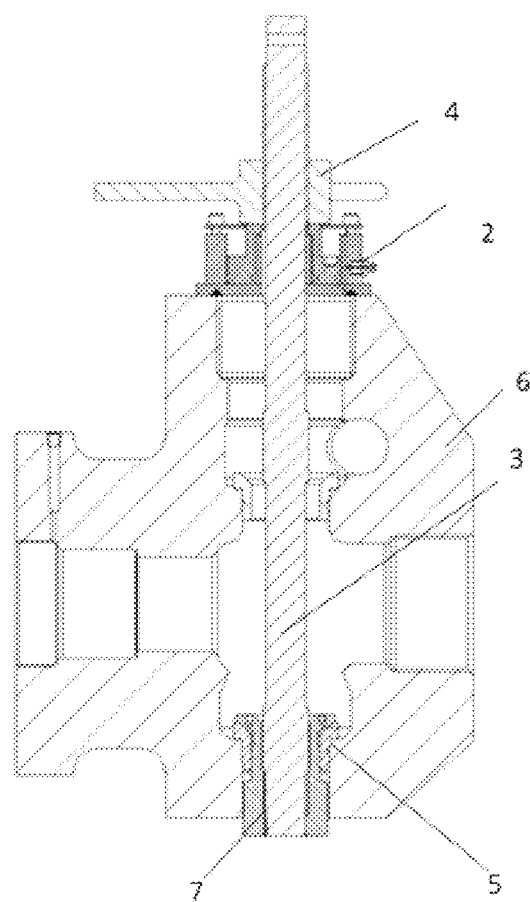
FIG. 13 illustrates a longitudinal sectional view of a puller according to an embodiment of the present disclosure which is installed on a valve seat.

In some embodiments, as illustrated in FIG. 13, the method further includes: screwing one end of the leading screw 3 into the puller through the first notch part 712b, the second notch part 712c, the third notch part 722b and the fourth notch part 722c, so that one end of the leading screw 3 is connected with the first pulling part and the second pulling part, for example, the thread at one end of the leading screw 3 is in threaded connection with the first thread and the second thread; and sleeving the hydraulic driving device 2 onto the other end of the leading screw 3 and fixing the hydraulic driving device 2 through a nut 4. In some embodiments, the hydraulic driving device includes a hydraulic cylinder, and sleeving the hydraulic driving device onto the leading screw includes: sleeving a middle hole of the hydraulic cylinder onto the leading screw.

In some embodiments, the method further includes: controlling the leading screw 3 to rotate through the hydraulic driving device 2, so that the first pulling part 71 and the second pulling part 72 drive the valve seat 5 to move. According to the embodiment of the present disclosure, the valve seat is pulled out by the force of the hydraulic cylinder.

The above are merely specific embodiments of the present disclosure, and the scope of protection of the present disclosure are not limited thereto. Any modifications or substitutions that can be easily made by those skilled who are familiar with the prior art without departing from the technical scope revealed in the present disclosure belong to the scope of protection sought to be protected by the present disclosure. Therefore, the scope of protection of the present disclosure should be defined by the appended claims

What is claimed is:

1. A puller, comprising a first claw and a second claw arranged opposite to each other, wherein,
the first claw comprises a first pulling part, a first limiting part and a first connecting part connecting the first pulling part and the first limiting part; the first limiting part comprises a first body part, a first notch part and a second notch part; the first notch part is located at one side of the first body part close to the second claw in a first direction, and the second notch part is located at one side of the first notch part away from the first body part in the first direction; a size of the second notch part in a second direction is larger than that of the first notch part in the second direction, and the second direction intersects with the first direction,
the second claw comprises a second pulling part, a second limiting part and a second connecting part connecting the second pulling part and the second limiting part; the second limiting part comprises a second body part, a third notch part and a fourth notch part; the third notch part is located at one side of the second body part close to the first claw in the first direction, and the fourth notch part is located at one side of the third notch part away from the second body part in the first direction; a size of the fourth notch part in the second direction is larger than that of the third notch part in the second direction,
a size of the first limiting part in the first direction and a size of the first pulling part in the first direction are both larger than that of the first connecting part in the first direction; and a size of the second limiting part in the first direction and a size of the second pulling part in the first direction are both larger than that of the second connecting part in the first direction, and
a size of the second pulling part in the second direction is smaller than or equal to that of the second notch part in the second direction,
wherein the first limiting part comprises a first surface connected with the first connecting part and a second surface arranged opposite to the first surface,
an orthogonal projection of the first body part on a first reference plane where the second surface is located, an orthogonal projection of the first notch part on the first reference plane and an orthogonal projection of the second notch part on the first reference plane are combined to form a first semicircle,
the orthogonal projection of the first body part on the first reference plane overlaps with an arc side of the first semicircle, and
the orthogonal projection of the second notch part on the first reference plane overlaps with a straight line of the first semicircle, and
wherein the second limiting part comprises a third surface connected with the second connecting part and a fourth surface arranged opposite to the third surface,
an orthographic projection of the second body part on a second reference plane where the third surface is located, an orthographic projection of the third notch part on the second reference plane and an orthographic projection of the fourth notch part on the second reference plane are combined to form a second semicircle,
the orthogonal projection of the second body part on the second reference plane overlaps with an arc side of the second semicircle, and
the orthogonal projection of the fourth notch part on the second reference plane overlaps with a straight line of the second semicircle.

2. The puller according to claim 1, wherein the first claw and the second claw have the same shape and the same size, and a size of the first pulling part in the second direction is smaller than or equal to that of the fourth notch part in the second direction.

3. The puller according to claim 1, wherein the first semicircle and the second semicircle are configured to be combined into a complete circle.

4. The puller according to claim 1, wherein the orthogonal projection of the second notch part on the first reference plane is a first rectangle, and the orthogonal projection of the first notch part on the first reference plane is a shape formed by a first circular arc and a long side of the first rectangle.

5. The puller according to claim 1, wherein the orthogonal projection of the fourth notch part on the second reference plane is a second rectangle, and the orthogonal projection of the third notch part on the second reference plane is a shape formed by a second circular arc and a long side of the second rectangle.

6. The puller according to claim 3, wherein the first connecting part comprises a first inner sidewall and a first outer sidewall, the first inner sidewall is connected with a surface of the first body part close to the first notch part, and the first outer sidewall is arranged opposite to the first inner sidewall.

7. The puller according to claim 6, wherein the second connecting part comprises a second inner sidewall and a second outer sidewall,
the second outer sidewall is connected with a surface of the second body part close to the third notch part, and the second outer sidewall is arranged opposite to the second inner sidewall.

8. The puller according to claim 7, wherein the first pulling part comprises a third inner sidewall and a third outer sidewall,
the third inner sidewall is connected with the first inner sidewall, the third inner sidewall is arranged opposite to the third outer sidewall, and the third inner sidewall is provided with a first thread which extends from the third inner sidewall to the first inner sidewall.

9. The puller according to claim 8, wherein the second pulling part comprises a fourth inner sidewall and a fourth outer sidewall,
the fourth inner sidewall is connected with the second inner sidewall, and the fourth inner sidewall is provided with a second thread which extends from the fourth inner sidewall to the second inner sidewall.

10. The puller according to claim 6, wherein the first outer sidewall comprises a first groove, and the second outer sidewall comprises a second groove.

11. A claw, comprising a pulling part; a limiting part and a connecting part connecting the pulling part and the limiting part, wherein the limiting part comprises a main body part, a first notch part and a second notch part which are sequentially arranged in a first direction; a size of the second notch part in a second direction is larger than a size of the first notch part in the second direction, and the second direction intersects with the first direction,
a size of the limiting part in the first direction and a size of the pulling part in the first direction are both larger than a size of the connecting part in the first direction; and a size of the pulling part in the second direction is smaller than or equal to the size of the second notch part in the second direction,
wherein the limiting part comprises a first surface connected with the connecting part and a second surface arranged opposite to the first surface,
an orthographic projection of the main body part on a reference plane where the second surface is located, an orthographic projection of the first notch part on the reference plane, and an orthographic projection of the second notch part on the reference plane are combined to form a semicircle,
the orthographic projection of the main body part on the reference plane overlaps with an arc side of the semicircle, and the orthographic projection of the second notch part on the reference plane overlaps with a straight line of the semicircle, and
wherein the orthographic projection of the second notch part on the reference plane is a rectangle, and the orthographic projection of the first notch part on the reference plane is a shape formed by a circular arc and a long side of the rectangle.

12. The claw according to claim 11, wherein a size of the pulling part in a third direction is larger than ½ of a size of the connecting part in the third direction.

13. The claw according to claim 11, wherein the connecting part comprises a first inner sidewall and a first outer sidewall,
the first outer sidewall is connected with a surface of the main body part close to the first notch part, and the first outer sidewall is arranged opposite to the first inner sidewall.

14. The claw according to dab 17, wherein the pulling part comprises a third inner sidewall and a third outer sidewall,
the third inner sidewall is connected with the first inner sidewall, the third inner sidewall is arranged opposite to the third outer sidewall, and the third inner sidewall is provided with a thread which extends from the third inner sidewall to the first inner sidewall.

15. A usage method of a puller comprising:
providing the puller, the puller, comprising a first claw and a second claw arranged opposite to each other, wherein,
the first claw comprises a first pulling part, a first limiting part and a first connecting part connecting the first pulling part and the first limiting part; the first limiting part comprises a first body part, a first notch part and a second notch part; the first notch part is located at one side of the first body part close to the second claw in a first direction, and the second notch part is located at one side of the first notch part away from the first body part in the first direction; a size of the second notch part in a second direction is larger than that of the first notch part in the second direction, and the second direction intersects with the first direction,
the second claw comprises a second pulling part, a second limiting part and a second connecting part connecting the second pulling part and the second limiting part; the second limiting part comprises a second body part, a third notch part and a fourth notch part; the third notch part is located at one side of the second body part close to the first claw in the first direction, and the fourth notch part is located at one side of the third notch part away from the second body part in the first direction; a size of the fourth notch part in the second direction is larger than that of the third notch part in the second direction,
a size of the first limiting part in the first direction and a size of the first pulling part in the first direction are both larger than that of the first connecting part in the first direction; and a size of the second limiting part in the first direction and a size of the second pulling part in the first direction are both larger than that of the second connecting part in the first direction, and
a size of the second pulling part in the second direction is smaller than or equal to that of the second notch part in the second direction,
placing the first claw into a valve seat and pushing the first claw towards an edge of the valve seat,
placing the second claw into the valve seat through the second notch part and pushing the second claw towards the edge of the valve seat,
assembling the first claw with the second claw,
screwing one end of a leading screw into the puller through the first notch part, the second notch part, the third notch part and the fourth notch part, so that the one end of the leading screw is connected with the first pulling part and the second pulling part, and
sleeving a hydraulic driving device onto the other end of the leading screw and fixing the hydraulic driving device by a nut, wherein the first limiting part and the second limiting part respectively are abutted against an upper end face of the valve seat.

* * * * *